Nov. 9, 1937.  L. T. TROLAND  2,098,441
PHOTOGRAPHIC PROCESS WITH EXPOSURE DIMINUTION
Filed Aug. 10, 1933  2 Sheets—Sheet 1
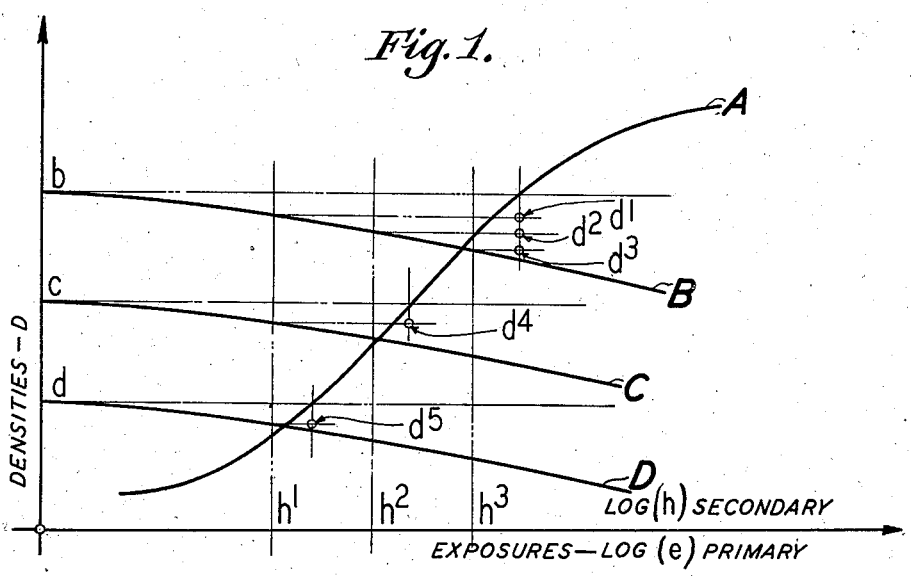
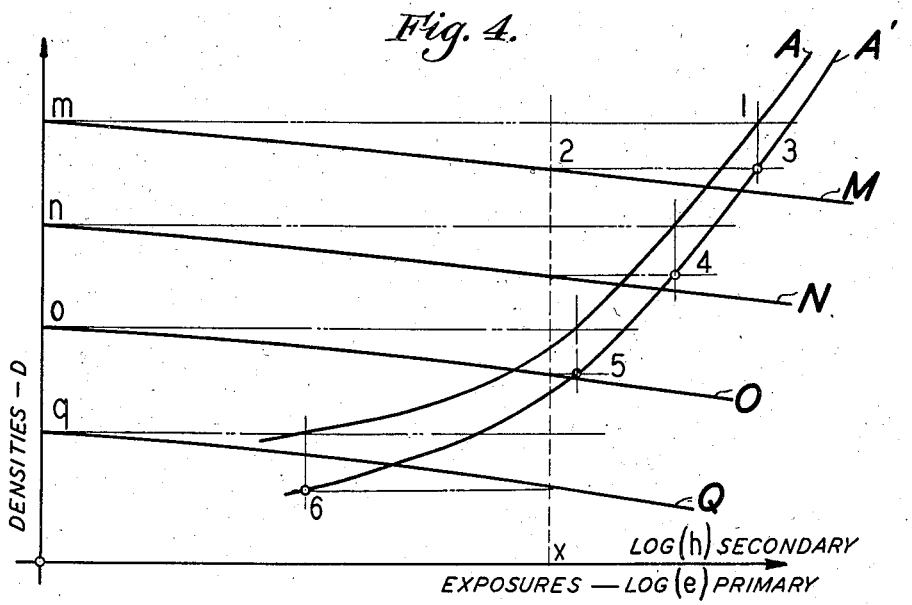
Inventor,
LEONARD T. TROLAND, DECEASED,
CAMBRIDGE TRUST COMPANY, EXECUTOR
by Roberts, Cushman & Woodberry.
Attys.

Nov. 9, 1937.  L. T. TROLAND  2,098,441
PHOTOGRAPHIC PROCESS WITH EXPOSURE DIMINUTION
Filed Aug. 10, 1933   2 Sheets-Sheet 2
Fig. 2.
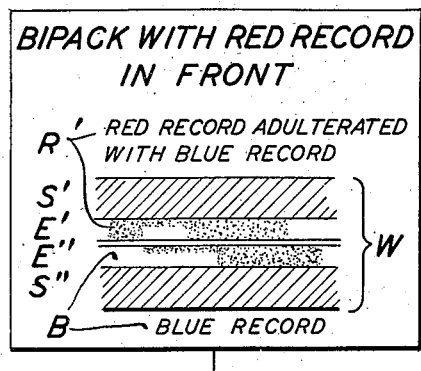
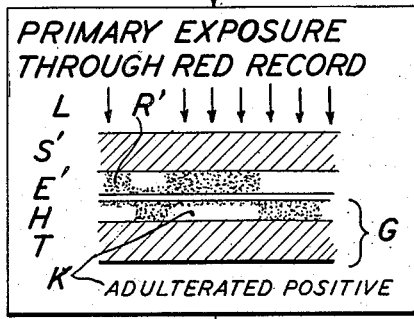
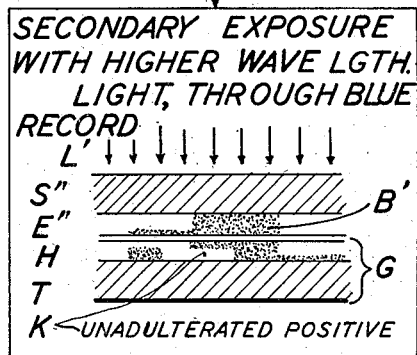
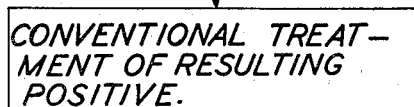
Fig. 3.
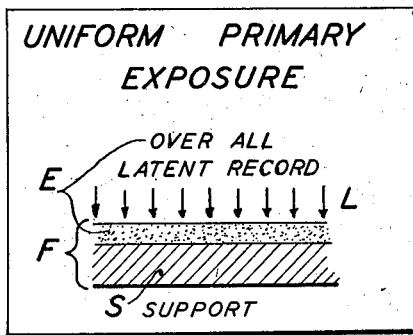
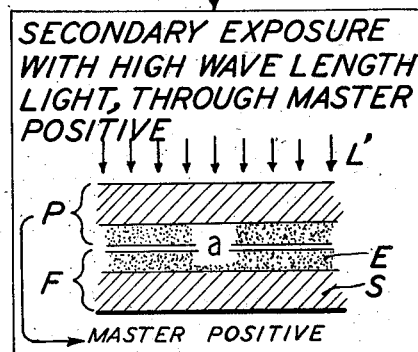
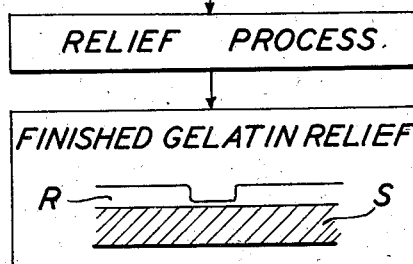
Inventor;
LEONARD T. TROLAND. DECEASED.
CAMBRIDGE TRUST COMPANY. EXECUTOR
by Roberts, Cushman & Woodbury
Attys.

Patented Nov. 9, 1937

2,098,441

UNITED STATES PATENT OFFICE 2,098,441

PHOTOGRAPHIC PROCESS WITH EXPOSURE DIMINUTION

Leonard T. Troland, deceased, late of Cambridge, Mass., by the Cambridge Trust Company, executor, Cambridge, Mass., assignor to Technicolor Motion Picture Corporation, Hollywood, Calif., a corporation of Maine Application August 10, 1933, Serial No. 684,546

3 Claims. (Cl. 95—5.6)

It is well known that latent photographic records produced with light of a certain wave length range, if subsequently exposed to rays of a higher wave length, are photographically diminished or retrogressively destroyed in proportion to the intensity of the second exposure. This phenomenon is commonly referred to as "Herschel effect" and is perhaps related to the well known solarization phenomenon which consists in substance in the fact that a prolonged or otherwise very intensive exposure may, after development, result in a blackening of the photographic emulsion to a lower degree than the blackening effected by weaker light intensities. However, whereas solarization depends upon prolonged exposures, the Herschel effect appears to be substantially independent therefrom and merely dependent upon the cooperation of consecutive exposures with light of different wave lengths. Although scientists do not quite agree upon the exact nature or theory of the Herschel effect, it is an established fact that the effect of an initial or primary exposure upon a photographic emulsion is reversed upon exposure to light waves of higher wave length, herein referred to as secondary exposure, and that this result is more rapid, certain and proportional to the intensity of the secondary exposure than any effect that might be obtained with ordinary solarization.

It has been found that this so-called Herschel effect lends itself very well to practical application and permits the carrying out of certain photographic operations which could otherwise not be undertaken at all or only with difficulty. These practical applications make use of the fact that the Herschel effect permits the quantitative subtraction of exposures, which subtraction permits the introduction of a new photographic method of the general nature of an inversion of heretofore known photographic procedures, which method in its various possibilities, is of considerable practical value.

Although it is herein referred to, the Herschel effect, it is understood that the present invention is not limited to the utilization of this phenomenon as defined at any given stage of development of the photochemical science, (which definitions might very well vary to a considerable extent), but that it embraces, independently of any proposed theory or explanation, the herein described practical applications of the possibility of diminishing or reducing the intensity of a photographic record by means of a secondary exposure, as defined in the appended claims.

The new method will be explained in its generic aspect as well as in several specific examples, with reference to drawings, in which:

Fig. 1 is a set of density-exposure curves indicating the effect of primary and secondary exposures employed in the present method;

Fig. 2 is a flow diagram illustrating the invention as applied to the separation of color records;

Fig. 3 is a similar diagram illustrating the making of gelatin reliefs, according to the invention; and Fig. 4 is a set of curves similar to Fig. 1, illustrating the modification of photographic gradation according to the invention.

In its generic aspect, the invention proposes the combination of pictorial photographic records by means of primary and secondary exposures, whose effect will first be generally explained. In Fig. 1, A is the well-known Hurter and Driffield curve, commonly referred to as H and D curve, of a given emulsion, which presents densities of a devoloped record plotted over the logarithms of effective exposures, that is, over the log $(i \times t)$ where $i$ is the exposure light intensity and $t$ the exposure time, the product being measured in candle meter seconds. B is a similar curve, signifying the Herschel effect, obtained by varying secondary exposures of a plate, uniformly pre-exposed to light of a certain wave length to light of a higher wave length. Point $b$ of curve B corresponds to the density obtained with a secondary exposure zero, that is, to the density of the developed pre-exposed plate not subjected to any secondary exposure. The other points of the drooping curve correspond to developed densities obtained upon increasing amounts of secondary exposure, and it is evident that the ratio of density decrease is fairly uniform over the density range corresponding to the substantially straight part of curve A. Curves C, D similarly signify the effect of secondary exposures subsequent to primary exposures which, without secondary exposures, would result in lower densities, $c$, $d$, as indicated.

It is therefore apparent that, if a photographic emulsion is exposed to an object field, certain portions receiving equal primary exposures which would result in density $b$, and if three of these portions are then subjected to different secondary exposures $h^1$, $h^2$, $h^3$, for example through a photographic record, and developed, the densities of these portions will be reduced to $d^1$, $d^2$, $d^3$, respectively, as indicated in Fig. 1.

On the other hand, if points of different primary exposures, that is, points which would have densities $b$, $c$, $d$, if developed without previous secondary exposure, are subjected to a certain uniform secondary exposure $h^1$, and developed, the resulting densities are $d^1$, $d^4$, $d^5$. Since the most suitable portions of primary and secondary exposure curves can be selected, and since the shapes of these curves can be controlled with reasonable certainty, it is evident that not only can two exposures be subtracted without disturbing the density gradients of the exposures, especially by using the substantially straight line portions of the exposures, but also that the density gradients of exposures can be changed at will, as will be explained more in detail hereinafter.

It should be observed that we are herein dealing not with the subtraction of densities, that is, speaking in terms of the H and D curve, the subtraction takes no place between the ordinates of the curves, but that the Herschel effect involves rather an arithmetic subtraction of exposures inside the expression (log E) for the abscissas of the curve, as for example, log $(e-h)$ if $e$ signifies a primary and $h$ a secondary exposure. It must thereby be observed, however, that it is not generally possible with elementary means directly to relate $e$ and $h$, due to the different nature of the two exposures, so that the above way of explaining the operation of the Herschel effect with sets of curves for the primary and secondary exposures is perhaps the preferable expedient for visualizing and evaluating this phenomenon and its practical utilization, as herein disclosed.

The generic aspect of subtracting exposures, whereby both exposures vary over the field of exposure, will now be further explained by applying this principle to the problem of separating records of so-called monopack films, to which the present invention lends itself very well.

As for example described in the same invention copending application Serial No. 425,206, entitled "Multicolor film and method", filed February 1, 1930, now Patent No. 1,928,709 of October 3, 1933, it is possible to separate superposed records of different color aspects of an object field, which records are contained in the emulsion of a so-called monopack film. By first copying the records in superposition, then removing one record, and printing the remaining record and the first copy together, it is possible to obtain a separate duplicate of the removed record. However, such methods can only be employed when the records are substantially independent and involve a superposition of separately produced densities in essentially distinct emulsion layers. These methods are not applicable where a composite record involves an addition of interpenetrative exposures in a single emulsion stratum rather than a superposition of densities. When such conditions prevail, the Herschel effect provides means for the subtraction of a given color record from a composite record of this interpenetrative exposure type, since it permits to subtract exposures rather than densities. A good example of emulsions bearing interpenetrative exposures is the front emulsion of a bipack which records the red color aspect in front of a mainly blue sensitive emulsion, for the purpose of obtaining a sharp red record and transferring the diffusion blur to the blue record where it is of minor disadvantage. Bipacks of this kind are well known in the art and for example described in British Patent 321,998, for "Improvements in or relating to three-colour photography", to Thomas Thorne Baker. Bipacks of this type have the outstanding disadvantage that the red recording, and therefore red sensitive front emulsion, is necessarily more or less blue sensitive, so that the red record is always adulterated with a blue record, this adulteration involving, due to its nature, a summation of interpenetrating exposures rather than a superposition of densities. This blue, adulterating exposure is, for obvious reasons, very undesirable, but can be eliminated from the red sensitive front film by utilizing the Herschel effect according to the present invention, for example in the following manner:

The bipack front film containing the composite red and blue exposure is developed, and a latent composite positive printed therefrom; this printing step constituting a primary exposure in the sense of this term as herein used. This latent record is then exposed, through the conventionally finished back negative of the bipack, that is, the blue record, to light of higher wave length than that of the primary exposure, so that the latter is destroyed to degrees varying with the densities of the blue negative. In this manner, the blue exposure component is subtracted from the red exposure component of the composite positive, which, upon development, represents a substantially pure and unadulterated red record positive; from which a pure red record duplicate negative can be made, which, with the black film record, constitutes a complementary pair of unadulterated color aspect records. It is of course understood that instead of secondarily exposing a latent positive to a substantially permanent negative, a latent composite negative, for example, the original negative, can be exposed to a positive, for example, the original back film record.

The emulsions used for practically utilizing the Herschel effect must be selected with a view to suitability for that purpose. Good results were obtained with customary emulsions, preferably treated prior to use by bathing in a 1 to 2% solution of potassium bromide for about five minutes, with subsequent drying. It was also found that dyed emulsions suitable for making gelatin matrices, of the type as described in the same invention copending application Serial No. 454,973, filed May 23, 1930, matured into Patent No. 2,044,864, of June 23, 1936, are especially suitable for purposes of the present invention. The primary exposure may be made with daylight, or with the customary artificial light sources used for photographic negative and positive processes, whereas secondary exposure with light of a wave length of approximately 700 to 780 mu was found to be satisfactory, although experiments with primary X-ray exposures and secondary exposures with white light also gave acceptable results. The primary exposures do not substantially differ from ordinary exposures, whereas, concerning duration, it is difficult to give exact data for the secondary exposures, since they depend a good deal upon the conditions in each particular case. It was found that an emulsion having received a primary exposure corresponding to a customary printing exposure of about one-half second, gave, in the above-described monopack process, satisfactory results with a secondary exposure through the blue record with light concentrated from a high-power tungsten filament lamp filtered through a filter passing substantially the above given spectral range, for about five to twenty seconds, depending on the strength of the light source, and the record density. A suitable filter is any of the commercial infra red filters, or a combination of a so-called "Dark Theatre Blue" filter and a "Selenium Red" (Nos. 503 and 242, listed in the publication entitled "Glass Color Filters" of the Corning Glass Works) glass filter, which transmits practically only infra red light, with a very small percentage of visible deep red.

This improved bipack (or tripack) method is schematically illustrated in Fig. 2, where W is a bipack with a front film comprising support S' with red-blue sensitive emulsion E' and a back film comprising support S'' with blue sensitive emulsion E''. Emulsion E' contains a red record R' adulterated with a record substantially corresponding to the blue record B' of emulsion E''. The two bipack component films are finished as usual and a master positive film G with emulsion H and support T is then exposed to record R' with light L so that emulsion H receives a latent record K which is a positive of record R' and comprises the adulteration of the latter. Subsequently, without intermediate treatment, emulsion H is subjected to a secondary exposure with high wave length light L' through negative record B'. This secondary exposure reduces the latent record K according to a pattern which corresponds to the blue record B', so that the new latent record K' does not contain the adulterating blue component which was present in latent record K. Care must of course be taken that the secondary exposure of G is so adjusted that not more exposure is subtracted from record H than corresponds to the blue adulteration of record R'. After development, film G represents a correct positive K' of the red color aspect, which, together with the initially correct blue negative record B' can be further utilized according to conventional methods.

Concerning the illustration of the invention in Figs. 2 and 3, it should be remarked that the record patterns are indicated by varying thickness only (as it would be present, at least substantially, in emulsions having incorporated highly light absorbing substances) whereas these patterns might as well be represented by varying overall particle distribution.

While the heretofore described aspect of the invention deals with the combination of primary and secondary exposures with the intensity values of both exposures varying over the record field or where, in other words, both exposures are pictorial, the examples now to be described comprise combined exposures where one exposure is of an intensity uniform over the entire record field.

It is well known in the photographic art to produce so-called gelatine relief matrices by printing from a negative record upon a positive film (usually treated with a light restraining dye) through its support, developing with a hardening (for example pyrogallol) developer (or independently hardening after development), and dissolving the unhardened gelatin, which is substantially co-extensive with the unexposed emulsion portions, so that the remaining relief constitutes a positive record which can be further utilized by dyeing its gelatin and either using the dyed-up relief directly, or transferring the dye to a blank film, by means of the well known so-called imbibition process.

The making of reliefs in this manner has certain disadvantages, especially that of the necessity of printing through the support, which requires projection printing with the accompanying well known complications. It has been found that the Herschel effect can be employed for the making of gelatin reliefs by simple contact printing, in the following manner.

A photographic emulsion (preferably of the type containing light absorbing substances, for example according to the above-identified application) is exposed to uniform, preferably white light that is strongly absorbed by the emulsion, until it is uniformly exposed or "fogged" through to the surface adhering to the support. Next, the emulsion is exposed through the outer surface (that is, the surface opposite the support), to light adapted to produce the Herschel effect, by contact printing from a master positive. The result is a graduated destruction of the primary exposure.

This process is schematically indicated in Fig. 3, where F is a film with support S and emulsion E. The emulsion is first given a uniform primary exposure with ordinary light L, whereby it receives a latent uniform overall record. Film F is then brought into contact with master positive P and subjected to a secondary exposure with high wave length light L', which destroys the primary exposure in accordance with the pictorial pattern of the master positive P, as indicated at $a$. The film is then treated according to one of the customary relief processes as, for example, developing in a pyrogallol developer, fixing, bleaching and etching in warm water. The result is a gelatin relief R correctly reproducing the pattern of the master positive.

The above described modification involves uniform primary and graduated secondary exposures, whereas the following practical embodiment of the Herschel effect operates with a graduated primary exposure and a uniform secondary exposure. In the making of gelatin reliefs, it is generally very important to steepen the graduation in the low density or toe portion of the H and D curve. This problem is discussed at length in the U. S. Patent No. 1,677,665 to Troland and Weaver, entitled "Photography", of July 17, 1928, which patent teaches one solution of the problem. It has been found that a similar result can be obtained by means of the method employing the Herschel effect, which has in some instances advantages over the patented method. In the preferred embodiment of this modification of the present invention, one prints from a negative record through the support of an emulsion having incorporated some light restraining medium, as customary in the making of gelatin reliefs, for example an emulsion of the type described in the already mentioned copending application, Serial No. 454,973. Before developing, there is given a uniform overall secondary exposure with light of considerable higher wave length than that of the primary exposure, also through the support. This secondary exposure has a pronounced effect of steepening the graduations in the toe of the density-log exposure curve of the ensuing relief. The reason for this effect is apparently the above-discussed subtraction of exposures of different wave length, which may be visualized as indicated in Fig. 4. In this figure, A is again a conventional H and D curve, of which only the lower, or toe portion is shown. M, N, O, Q are curves representing the Herschel effect as discussed hereinbefore, namely by indicating ultimate density values corresponding to varying secondary exposures, when the primary exposure has a certain value (as for example, $m$, $n$, $o$, $q$), which would be obtained by development with secondary exposure zero. Taking for example a secondary uniform exposure $x$ and curve M, point 1 of curve A corresponds to initial density $m$ of curve M. The secondary exposure $x$ reduces the ultimate density to value 2, so that density 1 of curve A, which would have been obtained by development without secondary exposure is reduced by the latter to density 3. Similarly, points 4, 5, 6 of curve A' are obtained, which is for obvious geometrical reasons, steeper than curve A.

It should be observed in this connection that infra red rays penetrate readily through the customary matrix emulsion used for making photographic reliefs. Their effect is therefore not confined to the emulsion strata near the support, which would cause a destruction of these strata so that the final relief would not be properly attached to the support. Whether these explanations are correct or not, it has been found by practical experience that the contrast in the low density range of gelatin reliefs is considerably increased by applying secondary exposures in the manner described, and subsequently treating the film in conventional manner by hardening development, fixing, bleaching and etching in warm water.

It has also been found that primary exposures with X-rays as mentioned before, and secondary exposures with radiations of higher wave length, which in this case may be ordinary white light, can be employed advantageously, especially in instances where a uniform primary exposure is applied. It has also been found that treatment in certain substances of the class known in the art as desensitizers (as for example phenosafranine), intermediate primary and secondary exposure, influences the latent record of the emulsion so as to permit the use of light of substantially the same wave lengths for both primary and secondary exposure. It will be apparent that these phenomena, as far as their practical application to pictorial photography is concerned, are in their action quite similar to that of the Herschel effect which is herein more particularly described, and that one or the other will be preferably used according to convenience and expediency.

It should be understood that the present disclosure is for the purpose of illustration only and that this invention includes all modifications and equivalents which fall within the scope of the appended claims.

What is claimed is:

1. The method of controlling the gradation of a photographic gelatin relief, which comprises exposing a photographic emulsion through its support to an object field, uniformly exposing the latent record through said support to light adapted photographically to diminish said record, developing the record and hardening the gelatin coextensive with said record, and removing the gelatin portions not coextensive with the developed record.

2. The method of producing photographic records, which comprises forming a latent record in a photographic emulsion containing a light restraining agent, said record being concentrated near one surface of said emulsion, subjecting said latent record to a uniform exposure through said surface with light of predetermined intensity and wave length which photographically diminishes predominantly the lower densities of said latent record, developing said record, differentiating the gelatin portions corresponding to the developed record from the non-record portions, and removing said non-record portions.

3. The method of controlling the characteristic curve of a photographic image, which comprises making in a photographic emulsion a latent record of an object field with light of a certain frequency range, said record having a curved density exposure relation and being concentrated near a surface of said emulsion, subsequently subjecting said record to an over-all exposure through said surface with light of lower frequency which subtracts from all densities of said latent record exposure amounts in substantially linear relation to said densities, and developing the resultant record, said overall exposure being controlled to steepen the lower part of the density-exposure curve of said record.

CAMBRIDGE TRUST COMPANY,
Executor of the Last Will and Testament of Leonard T. Troland, Deceased.
By A. MEAD WHEELER,
Asst. Secy.